US011905140B2

(12) United States Patent
Bizzozero et al.

(10) Patent No.: US 11,905,140 B2
(45) Date of Patent: Feb. 20, 2024

(54) MEASURING TAPE ARRANGEMENT FOR USE IN AN ELEVATOR SYSTEM AND METHOD FOR INSTALLING AND OPERATING AN ELEVATOR SYSTEM

(71) Applicant: Inventio AG, Hergiswil (CH)

(72) Inventors: Gabriele Bizzozero, Gisikon (CH); Lukas Christen, Kilchberg ZH (CH)

(73) Assignee: INVENTIO AG, Hergiswil (CH)

( * ) Notice: Subject to any disclaimer, the term of this patent is extended or adjusted under 35 U.S.C. 154(b) by 326 days.

(21) Appl. No.: 17/310,736

(22) PCT Filed: Mar. 13, 2020

(86) PCT No.: PCT/EP2020/056939
§ 371 (c)(1),
(2) Date: Aug. 20, 2021

(87) PCT Pub. No.: WO2020/193235
PCT Pub. Date: Oct. 1, 2020

(65) Prior Publication Data
US 2022/0162039 A1 May 26, 2022

(30) Foreign Application Priority Data
Mar. 27, 2019 (EP) .................................... 19165540

(51) Int. Cl.
*B66B 1/34* (2006.01)
*B66B 19/00* (2006.01)

(52) U.S. Cl.
CPC ............ *B66B 1/3492* (2013.01); *B66B 19/00* (2013.01)

(58) Field of Classification Search
CPC .................................................... B66B 1/3492
USPC ........................... 33/700, 706, 707, 708, 763
See application file for complete search history.

(56) References Cited

U.S. PATENT DOCUMENTS

| | | | |
|---|---|---|---|
| 5,033,586 | A | 7/1991 | Richards et al. |
| 5,925,859 | A | 7/1999 | Miller et al. |
| 6,533,077 | B1 | 3/2003 | Glassey |
| 6,874,244 | B2 | 4/2005 | Birrer et al. |

(Continued)

FOREIGN PATENT DOCUMENTS

| | | | |
|---|---|---|---|
| CN | 2227107 | Y | 5/1996 |
| CN | 1854055 | A | 11/2006 |

(Continued)

*Primary Examiner* — George B Bennett
(74) *Attorney, Agent, or Firm* — William J. Clemens; Shumaker, Loop & Kendrick, LLP

(57) ABSTRACT

A measuring tape arrangement is used in an elevator system for determining a position of an elevator car along a travel path. The measuring tape arrangement has a one-piece measuring tape arranged along the travel path, wherein varying location information is stored along the measuring tape, by which information a current position of the car relative to the measuring tape can be determined, and a retaining structure arranged at an upper end of the travel path on which structure the measuring tape is fastened by a fastening device at a fixed position relative to the travel path. A receiving device receiving a measuring tape supply is arranged on the retaining structure, wherein a measuring tape piece of the measuring tape supply can arranged along an extension portion when the travel path is extended upwards by one extension portion.

14 Claims, 3 Drawing Sheets

(56) References Cited

U.S. PATENT DOCUMENTS

| | | | | |
|---|---|---|---|---|
| 7,562,747 | B2 * | 7/2009 | Marchesi | B66B 1/3492<br>33/708 |
| 7,669,698 | B2 * | 3/2010 | Jahkonen | B66B 1/3492<br>187/394 |
| 9,352,934 | B1 | 5/2016 | Lee | |
| 9,725,280 | B2 * | 8/2017 | De Coi | B66B 3/023 |
| 10,101,142 | B2 * | 10/2018 | Bjorni | B66B 19/00 |
| 11,548,759 | B2 * | 1/2023 | Michel | G01D 5/142 |
| 2013/0284544 | A1 | 10/2013 | De Coi et al. | |
| 2021/0276823 | A1 * | 9/2021 | Krambeck | B66B 5/0031 |

FOREIGN PATENT DOCUMENTS

| | | | |
|---|---|---|---|
| CN | 1944214 | A | 4/2007 |
| CN | 101573285 | A | 11/2009 |
| CN | 102448866 | A | 5/2012 |
| CN | 104955760 | A | 9/2015 |
| DE | 4401977 | A1 | 7/1995 |
| EP | 1412274 | B1 | 4/2004 |
| EP | 2657121 | A1 | 10/2013 |
| EP | 2657171 | A1 | 10/2013 |
| EP | 3231753 | A1 | 10/2017 |
| JP | 2000313577 | A | 11/2000 |
| WO | 2018234210 | A1 | 12/2018 |
| WO | 2019068469 | A1 | 4/2019 |
| WO | 2019141726 | A1 | 7/2019 |

* cited by examiner

MEASURING TAPE ARRANGEMENT FOR USE IN AN ELEVATOR SYSTEM AND METHOD FOR INSTALLING AND OPERATING AN ELEVATOR SYSTEM

FIELD

The invention relates to a measuring tape arrangement for use in an elevator system for determining a position of an elevator car along a travel path and to a method for installing and operating an elevator system in an elevator shaft of a building in its construction phase.

BACKGROUND

Elevator systems have at least one elevator car which can be moved within an elevator shaft along a vertically running travel path between different levels or floors. For this purpose, the elevator car is moved by means of a drive, and the drive is controlled by a controller. In order to be able to move the elevator car precisely and, for example, to stop its bottom flush with a bottom of a floor, the controller must have information about the current position of the elevator car.

In order to be able to provide such information, a special measuring system is usually provided in the elevator system. For example, EP 1 412 274 B1 describes an elevator system with a measuring system for determining the absolute car position.

In a specific type of measuring system, a tape is arranged along the travel path of the elevator car. Varying location information is stored on the tape. For example, the tape can be designed as a magnetic tape on which the location information is stored as locally varying magnetizations. A read-out device can be provided on the elevator car, by means of which the location information can be read out. The location information can then be evaluated and forwarded to the controller of the elevator system, so that, based on this location information, the controller can draw conclusions about the current position of the elevator car relative to the tape. Therefore, the tape herein is called a measuring tape.

The international patent application of the applicant with application number PCT/EP2019/051045 (WO 2019/141726 A1) describes a measuring tape arrangement for use in an elevator system for determining a position of an elevator car along a travel path, wherein the travel path does no longer change after installation and an initial start-up of the elevator system. The measuring tape arrangement has a measuring tape to be arranged along the travel path, wherein varying location information is stored along the measuring tape, by means of which a current position relative to the measuring tape can be determined. It also has a retaining structure to be arranged at an upper end of the travel path, on which the measuring tape is fastened by means of a fastening device at a fixed position relative to the travel path.

SUMMARY

In contrast, the problem addressed by the invention is in particular that of proposing a measuring tape arrangement and a method for installing and operating an elevator system which can be used particularly advantageously in a building in its construction phase. In particular, a low expenditure of time and/or costs are supposed to be made possible for installing the measuring tape arrangement. According to the invention, this problem is solved by a measuring tape arrangement and a method having the features described below.

The embodiments described below relate equally to the measuring tape arrangement and the method. In other words, features described below, for example, with reference to the measuring tape arrangement, can also be implemented as method steps, and vice versa.

The measuring tape arrangement according to the invention for use in an elevator system for determining a position of an elevator car along a travel path has a one-piece measuring tape to be arranged along the travel path, wherein varying location information is stored along the measuring tape, by means of which a current position relative to the measuring tape can be determined. It also has a retaining structure to be arranged at one end of the travel path, on which the measuring tape is fastened by means of a fastening device at a fixed position relative to the travel path. The retaining structure is provided in particular to be arranged at an upper end of the travel path. According to the invention, a receiving device for receiving a measuring tape supply is arranged on the retaining structure, wherein a measuring tape piece of the measuring tape supply is provided to be arranged along an extension portion when the travel path is extended upwards by one extension portion.

In elevator systems that are used in a building that is in its construction phase, the travel path of the elevator car is usually gradually extended upwards. In this case, there is no need to wait for the elevator system to be installed or operated until the building is completely finished. Instead, the elevator system is installed and operated as soon as some floors of the building, including the elevator shaft of the elevator system of these floors, have been completed. This means that the elevator system can already be used during the construction phase of the building for the vertical transport of people and/or material. As a result, elevators provided especially for transport tasks during the construction phase—for example, those which are attached to the outside of the building—can be completely or partially foregone.

The elevator system is therefore first installed in the lowest portion of the elevator shaft, for example, guide rails for guiding the elevator car and possibly a counterweight are securely fastened to the shaft walls, thus providing a lowest travel path portion for the elevator car. In order to be able to operate the elevator system, a measuring tape with varying location information is also arranged along the lowest travel path portion, on the basis of which a current position of the elevator car can be determined. After the installation of the elevator system in the lowest portion of the elevator shaft has been completed, the elevator system can be operated in the lowest portion of the elevator shaft, i.e., the elevator car can be moved vertically along the lowest portion of the travel path.

As soon as a further portion of the building and thus a second portion of the elevator shaft arranged above the lowest portion has been completed, the elevator system can also be installed and subsequently operated in the second portion of the elevator shaft. For this purpose, for example, guide rails must be securely fastened in the second portion of the elevator shaft. The travel path of the elevator car is thus lengthened upwards by an extension portion. In order to also be able to move the elevator cars along the extension portion, the measuring tape is also arranged along the extension portion. This described extension of the travel path is repeated until the building is completed and the elevator shaft has reached its final height. The described installation of the elevator system can be carried out, for example, using a method according to the international patent application of the applicant with application number PCT/EP2018/075347 (WO 2019/068469 A1).

Since the measuring tape of the measuring tape arrangement is designed as one piece, i.e., it consists of only one piece, it must originally have a length with which the final height of the elevator shaft and thus the final length of the travel path of the elevator car can be covered. As long as the travel path does not extend beyond its final length, there is a measuring tape supply that is required in subsequent extensions of the travel path. With each extension of the travel path, a piece of measuring tape from the measuring tape supply is arranged along an extension portion of the travel path; the measuring tape supply thus becomes smaller with each extension of the travel path.

Providing a receiving device according to the invention for receiving the described measuring tape supply on the retaining structure makes it possible to simply and quickly provide the measuring tape supply along the current travel path after the measuring tape has been arranged and to store it during the subsequent operation of the elevator system. If the travel path is extended upwards, the retaining structure must also be moved upwards, which is usually done by a fitter. Due to the arrangement of the receiving device on the retaining structure, the fitter has in this case also direct access to the measuring tape supply, which also allows for a simple and quick installation. If the measuring tape is removed from a container, for example, a cardboard box, the storage of the measuring tape supply on the retaining structure has the additional advantage that only a small part of the measuring tape has to be removed from the container, so that a very large part can remain in the container and is thus protected from damage.

The location information varying along the measuring tape can in particular be designed as locally varying magnetizations of a magnetic tape which are arranged in a so-called pseudo-random code. By detecting the pseudo-random code, clear conclusions can be drawn about the position of the elevator car relative to the measuring tape. The information can also be designed as optical information, for example, comparable to a barcode or a so-called QR code.

The measuring tape hangs down from the retaining structure over the fastening device. It is also possible for the retaining structure and the fastening device to be designed as a common component. It can be guided or held at its end opposite the fastening device in order to prevent the end from swinging. In particular, a tensioning device, for example, in the form of a tension weight, is arranged at the end in order to keep the measuring tape under a specific tension.

The retaining structure is designed in particular as a type of rail which is securely fastened in the elevator shaft and thus arranged in an immobilized or stationary position relative to the travel path. The receiving device for receiving the measuring tape supply is, for example, screwed, riveted, welded or glued to the retaining structure. It is also possible for the retaining structure and the receiving device to be designed as a common component.

In one embodiment of the invention, the receiving device has a support surface which is designed and arranged such that the measuring tape supply can be supported downwards on the support surface and horizontally on the retaining structure. It also has an end surface which is designed and arranged such that a measuring tape supply supported on the support surface is at least partially arranged between the retaining structure and the end surface. This allows the measuring tape supply to be securely accommodated while the construction of the holding device is simultaneously simple and therefore inexpensive.

In particular, the support surface is aligned horizontally and the end surface is aligned in particular vertically. In addition, the end surface is in particular directly adjacent to the support surface. A maximum extension of the support surface along the retaining structure is in particular less than a maximum extension of the end surface along the retaining structure, wherein the maximum extension of the end surface along the retaining structure is formed in particular above the retaining structure. The receiving device is arranged in particular on the retaining structure such that the end surface is arranged between the retaining structure and the shaft wall of the elevator shaft, on which the retaining structure is at least indirectly fastened in a secure manner.

In one embodiment of the invention, the receiving device has two opposite side cheeks which are designed and arranged such that a horizontal movement of the measuring tape supply along the retaining structure is delimited. This allows for a particularly secure accommodation of the measuring tape supply.

The side cheeks prevent the measuring tape supply from being able to be moved without restriction horizontally along the retaining structure, which could cause it to leave the receiving device, thus falling into the elevator shaft. The side cheeks adjoin the end surface in particular laterally and are in particular oriented at a right angle to the end surface. They extend in particular from the end surface in the direction of the retaining structure and are arranged in particular only above the retaining structure.

In particular, at least one side cheek, specifically both side cheeks, each have a support surface opposite the end surface. The support surfaces are aligned in particular parallel to the end surface. In particular, they are designed as narrow strips when compared to the end surface.

The support surface, the end surface and the side cheeks having the support surfaces are arranged in particular such that a container, in particular a cardboard box, accommodating the measuring tape supply can be accommodated with an exact fit, i.e., it can be held very securely.

In one embodiment of the invention, at least one side cheek, in particular both side cheeks of the receiving device, has a lug via which the receiving device can be securely fastened to the retaining structure. This allows for a particularly simple and thus cost-effective connection between the receiving device and the retaining structure. In particular, the lug has a through hole via which the lug and thus the receiving device can be screwed to the retaining structure.

In one embodiment of the invention, the receiving device is designed as one piece. It can thus be produced particularly cost-effectively. The receiving device is made in particular from a metal sheet from which a corresponding contour is punched out which is subsequently brought into the desired shape by bending or folding.

In one embodiment of the invention, the fastening device is designed and arranged such that the measuring tape is clamped and thus held in this manner. This allows the measuring tape to be fastened to the retaining structure in a simple and cost-effective manner, which is also easy to release and does not cause any damage to the piece of measuring tape used for fastening. In particular, damage to the piece of measuring tape used for fastening must be prevented because the measuring tape piece is also arranged in the extension portion when the travel path is extended and its location information is used to determine the current position of the elevator car.

In one embodiment of the invention, the fastening device has a clamping plate which can be securely fastened to the retaining structure such that the measuring tape is clamped between the clamping plate and the retaining structure. This particularly effectively allows the measuring tape to be attached to the retaining structure without damaging the measuring tape.

In particular, the clamping plate is screwed directly or indirectly to the retaining structure and the measuring tape is clamped between the clamping plate and the retaining structure. In particular, the measuring tape can also be clamped between the clamping plate and an intermediate plate arranged between the clamping plate and the retaining structure. In this case, the measuring tape is clamped only indirectly between the clamping plate and the retaining structure. In particular, the intermediate plate is also screwed to the retaining structure. In particular, the clamping plate and/or the intermediate plate have a rubber coating. As a result, damage to the measuring tape from clamping is particularly effectively prevented.

In one embodiment of the invention, the clamping plate has on its upper and/or lower edge a fold facing away from the retaining structure. This effectively prevents damage to the measuring tape from the clamping plate even if the measuring tape swings. The folds have, for example, an angle between 45 and 80° with respect to a region of the clamping plate against which the measuring tape bears.

In one embodiment of the invention, the retaining structure is provided to be securely fastened to a guide rail of the elevator system. This allows for a particularly simple immobilization of the retaining structure, in particular without the need to drill holes in a shaft wall of the elevator shaft. For example, the retaining structure can be securely fastened to the guide rail by means of suitable clamping elements.

In this embodiment, the receiving device is arranged in particular between the retaining structure and a shaft wall on which the guide rail is at least indirectly fastened in a secure manner.

The described measuring tape arrangements can be used particularly advantageously in a positioning system for use in an elevator system for determining a position of an elevator car along a travel path. Such a positioning system can be used particularly advantageously in an elevator system.

The above-mentioned problem is also solved by a method for installing and operating an elevator system in an elevator shaft of a building in its construction phase, which has at least the following steps:

- introducing an above-described measuring tape arrangement into the elevator shaft, wherein
  - the retaining structure of the measuring tape arrangement is fastened to an upper end of a lower travel path portion,
  - the measuring tape is fastened to the retaining structure by means of the fastening device, and
  - a measuring tape supply is arranged in the receiving device;
- extending the travel path upwards by an extension portion, wherein
  - the measuring tape is detached from the retaining structure,
  - a measuring tape piece of the measuring tape supply is arranged along the extension portion,
  - the retaining structure of the measuring tape arrangement is arranged at an upper end of the extension portion, and
  - the measuring tape is attached to the retaining structure by means of the fastening device.

After the extension of the travel path, the extension portion forms an upper travel path portion.

The steps are carried out in particular in the specified order but can also be carried out in a different order. In addition to the steps mentioned, in particular further steps, for example, securely fastening guide rails in the elevator shaft, are carried out.

Before the extension of the travel path, in particular an elevator car of the elevator system is moved along the lower travel path portion, wherein the position of the elevator car is determined by means of the aforementioned measuring tape arrangement.

After the extension of the travel path, in particular the elevator car of the elevator system is moved along the lower travel path portion and the extension portion, wherein the position of the elevator car is determined by means of the measuring tape arrangement.

If the measuring tape is fastened to the retaining structure by clamping by means of the fastening device, only the clamping is released in order to release the measuring tape from the retaining structure, and the fastening device is moved up along the measuring tape without removing the measuring tape from the fastening device. This can effectively prevent the measuring tape from twisting when the travel path is extended. A release of the measuring tape from the retaining structure thus means that the retaining structure can be moved with respect to the measuring tape after the release.

The extension of the travel path can be repeated. In particular, it is repeated until the travel path extends over the entire elevator shaft of the completed building. For the last extension, the retaining structure described can be replaced by a retaining structure that is provided for elevator systems whose travel path no longer changes after installation and initial start-up, for example, by a retaining device according to the international patent application of the applicant with application number PCT/EP2019/051045 (WO 2019/141726 A1).

When using the measuring tape arrangement according to the invention and carrying out the method according to the invention, the measuring tape is installed from bottom to top. In other words, one end of the measuring tape is arranged at the lower end of the travel path and thus of the elevator shaft, and then the measuring tape is guided upwards. As described, a measuring tape supply is therefore located at the retaining structure at the upper end of the travel path. During the initial start-up of the elevator system, a so-called learning run is usually carried out. For this purpose, the elevator car is slowly moved to all floors to be served and the position of the car on the floors is detected and stored. After the positions have been stored, the elevator car can move to the floors automatically. The described installation of the measuring tape from bottom to top has the advantage that a learning run carried out in a travel path portion does not have to be repeated after the travel path has been extended because the assignment between the location information of the measuring tape and the position of the elevator car remains unchanged in this portion of the travel path. This would not be the case if the measuring tape supply were to remain at the lower end of the elevator shaft and an end of the measuring tape arranged at the upper end of the travel path were to be moved upwards when the travel path is extended.

It must be noted that some of the possible features and advantages of the invention herein are described with reference to different embodiments of the measuring tape arrangement according to the invention and the method according to the invention. A person skilled in the art recognizes that the features can be combined, adapted, transferred or exchanged in a suitable manner in order to arrive at further embodiments of the invention.

Further advantages, features and details of the invention will become apparent from the following description of embodiments and from the drawings in which identical or functionally identical elements are denoted with identical reference signs. The drawings are merely schematic and not to scale.

DETAILED DESCRIPTION

Figure 1:
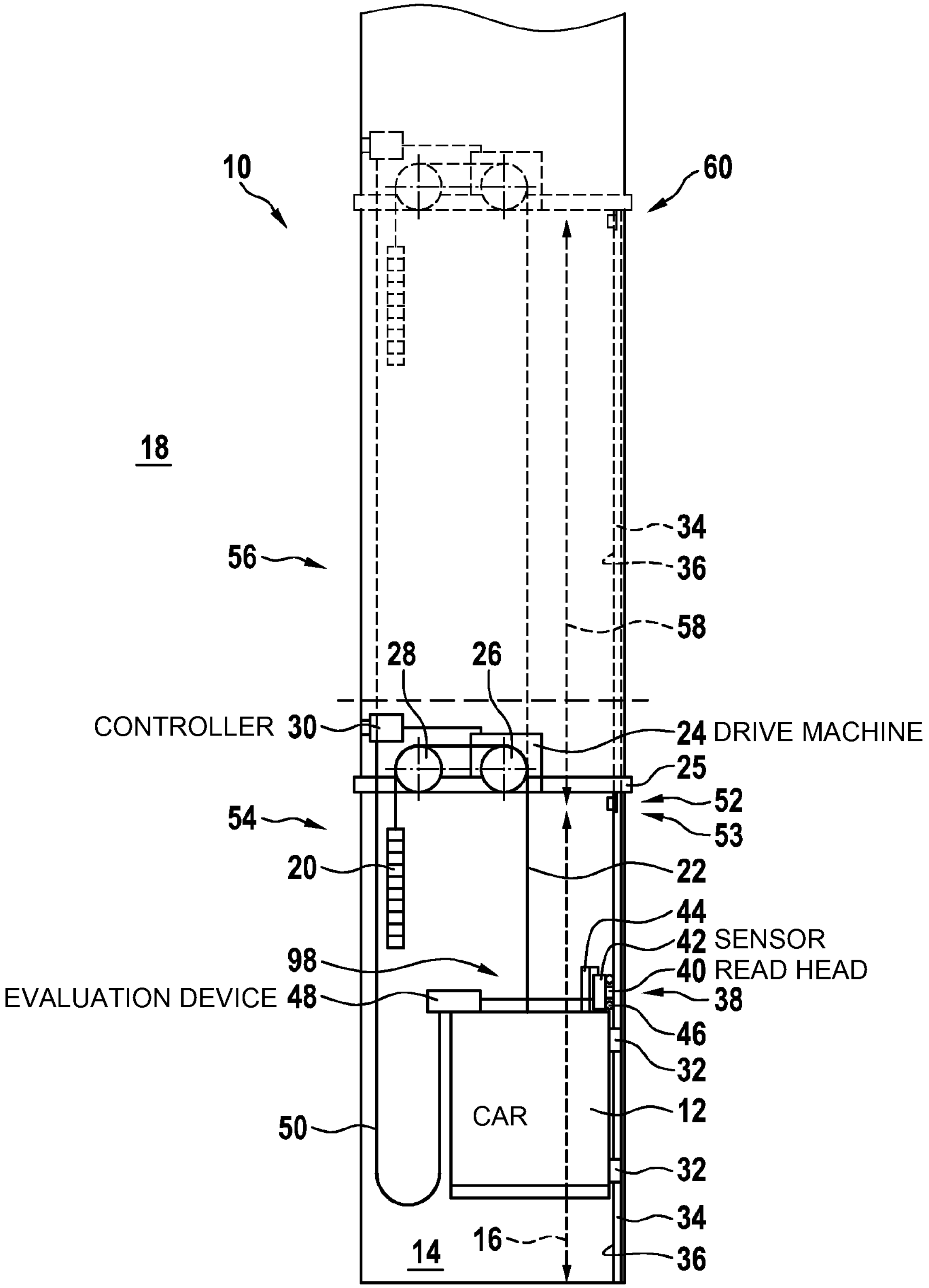
FIG. 1 shows an elevator system having a measuring tape arrangement according to the invention.

According to FIG. 1, an elevator system 10 has an elevator car 12 which can be moved vertically along a travel path 16 within an elevator shaft 14. For this purpose, the elevator car 12 and a counterweight 20 are connected to one another via a belt arrangement 22, wherein the belt arrangement 22 is guided over a drive pulley 26 driven by a drive machine 24 and over a deflecting pulley 28. An operation of the drive machine 24 is controlled by a controller 30. In this case, the drive machine 24, the driven drive pulley 26, the deflecting pulley 28, and the controller 30 are arranged on a retaining platform 25. During its movement along the travel path 16, the elevator car 12 is guided by guide shoes 32 which move along vertically extending guide rails 34. The elevator shaft 14 is arranged in a building 18 which is still in its construction phase. Construction is thus still in progress above the depicted section of the building 18.

In order to be able to determine an exact position of the elevator car 12 along its travel path 16, a measuring tape 36, for example, in the form of a magnetic tape, is attached in the elevator shaft 14. The measuring tape 36 extends essentially along, and preferably parallel to, the entire travel path 16 to be traversed by the elevator car 12. For example, the measuring tape 36 can run on or parallel to one of the guide rails 34.

A read-out device 38 is provided on the elevator car 12, by means of which the varying location information stored in the measuring tape 36 can be read out. In the event that the measuring tape 36 is designed as a magnetic tape, the varying location information is stored as locally varying magnetizations in magnetizable material of the magnetic tape. These local magnetizations can be read out by means of a magnetic read head 40 of the read-out device 38 as well as a read-out sensor system 42 designed for this purpose.

While the elevator car 12 moves through the elevator shaft 14, the read-out device 38, which is fastened by a fastening block 44, for example, to a roof of the elevator car 12, is moved along the measuring tape 36, guided by guide rollers 46. The location information read out by the read-out device 38 can be forwarded to an evaluation device 48, where it is evaluated or at least preprocessed in order to then be transmitted to the controller 30 of the elevator system 10 via a cable connection 50 or alternatively wirelessly.

Based on an accordingly determined absolute position of the elevator car 12, the controller 30 can then control the drive machine 24 in a suitable manner in order to be able to move the elevator car 12 to a desired position in a precise manner.

In order to be able to securely fasten the measuring tape 36 in a suitable manner within the elevator shaft 14, the measuring tape 36 is fastened to a retaining structure 52 via a fastening device (66 in FIGS. 2 to 4) not depicted in FIG. 1. The retaining structure 52 is securely fastened to the guide rail 34 at an upper end 53 of the travel path 16 and is thus arranged in a stationary or immovable manner within the elevator shaft 14. A measuring tape supply (80 in FIG. 2), not depicted in FIG. 1, is also arranged on the retaining structure 52. The measuring tape supply comprises at least one measuring tape piece (82 in FIG. 2) used for an extension of the travel path 16. A lower end of the measuring tape 36 can be fastened in a lower region of the elevator shaft 14, for example, on the bottom of the elevator shaft 14, or it can be provided with a tension weight (not depicted).

The elevator system 10 is initially only installed and operated in a lowest portion 54 of the elevator shaft 14. The elevator car 12 is thus moved along the travel path 16 which can also be called a lower travel path portion. In this case, the position of the elevator car 12 is determined on the basis of the location information of the measuring tape 36.

Above the lowest portion 54 of the elevator shaft 14, the building 18 and thus also the elevator shaft 14 are still under construction. For protecting the lowest portion of the elevator shaft, a so-called protective platform (not depicted) can be arranged in the elevator shaft, which protects the lowest portion of the elevator shaft from falling objects.

As soon as a further portion of the building 18 and thus a second portion 56 of the elevator shaft 14 arranged above the lowest portion 54 is completed, the elevator system 10 is also installed in the second portion 56 of the elevator shaft 14. For this purpose, the retaining platform 25 having the drive machine 24, the driven drive pulley 26, the deflecting pulley 28 and the controller 30 is first moved upwards by means of a construction crane (not depicted) and securely fastened in the elevator shaft 14. All the necessary components of the elevator system 10, for example, guide rails 34, are subsequently also mounted in the second portion 56 of the elevator shaft 14. The travel path 16 of the elevator car 12 is thus extended upwards by an extension portion 58. In order to be able to also determine the position of the elevator car 12 along the extension portion 58, the measuring tape 36 is also arranged along the extension portion 58. For this purpose, the measuring tape 36 is first detached from the retaining structure 52, and a measuring tape piece (82 in FIG. 2) of the measuring tape supply (80 in FIG. 2) is subsequently arranged along the extension portion 58. Finally, the retaining structure 52 is arranged on an upper end 60 of the extension portion 58 and the measuring tape 36 is fastened to the retaining structure 52 by means of the fastening device (66 in FIGS. 2 and 3).

When all the necessary installations in the second portion 56 of the elevator shaft 14 are completed, the elevator system 10 can also be put into operation in the second portion 56. The elevator car 12 can thus be moved along the lower travel path portion 16 and the extension portion 58. In this case, the position of the elevator car 12 is also determined on the basis of the location information of the measuring tape 36.

The described extension of the travel path is repeated until the building is completed and the elevator shaft 14 has thus reached its final height.

Figure 2:
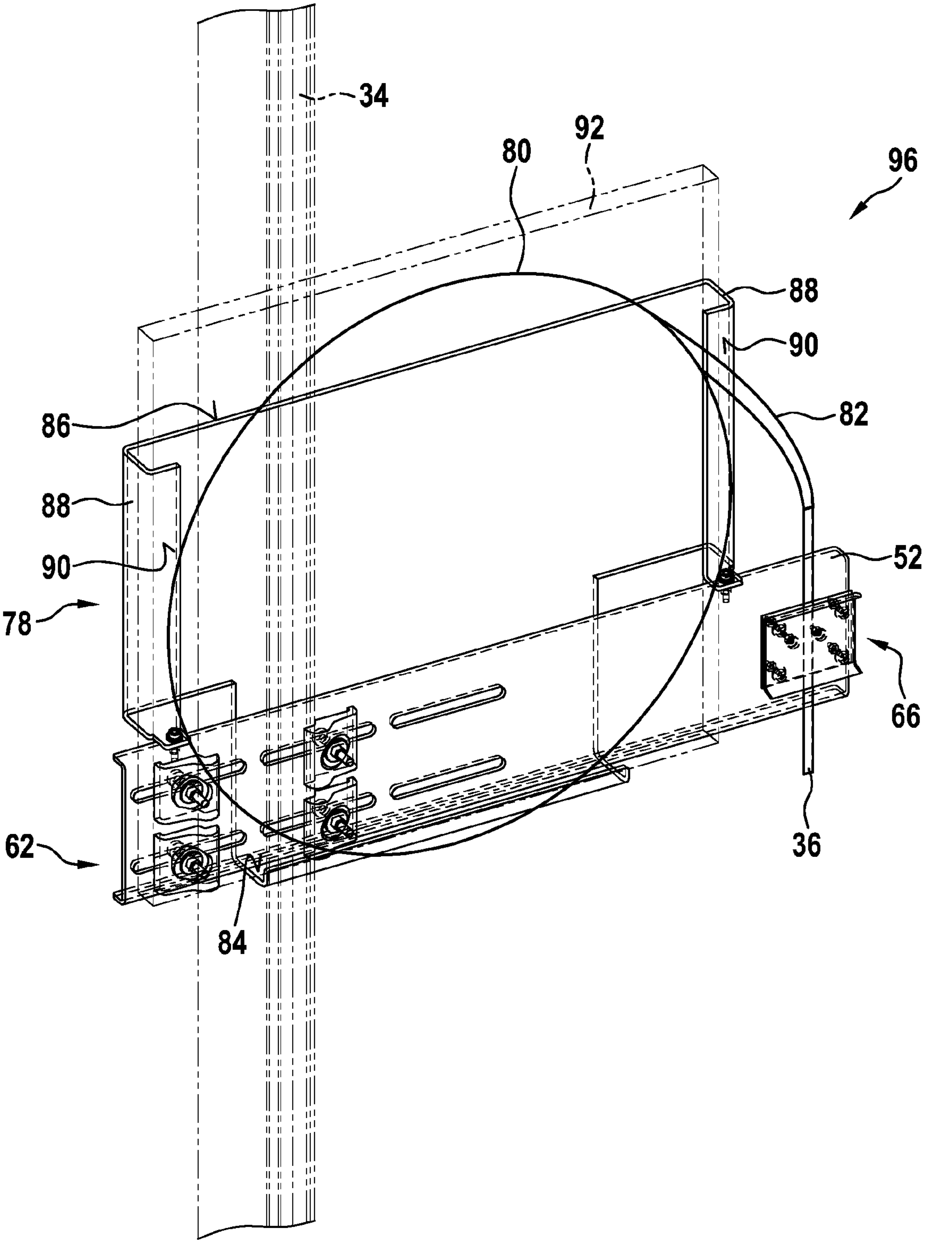
FIG. 2 is a perspective view of a retaining structure having a receiving device for receiving a measuring tape supply and a fastening device for fastening a measuring tape according to the invention.
Figure 3:
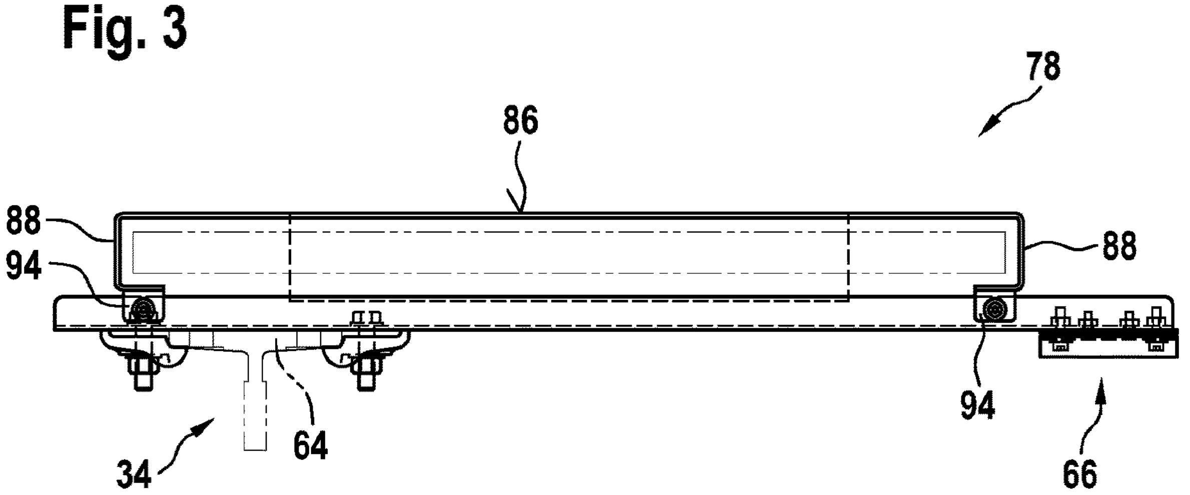
FIG. 3 is a top view of the retaining structure having the receiving device and the fastening device from FIG. 2.
Figure 4:
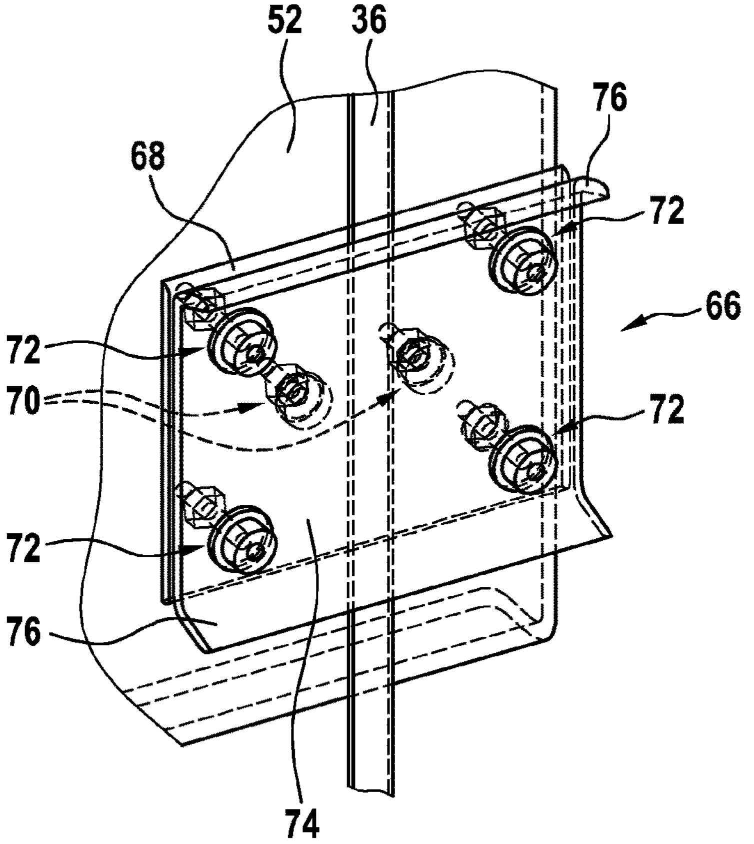
FIG. 4 is an enlarged view of the fastening device from FIGS. 2 and 3.

FIGS. 2 and 3 show the retaining structure 52 with all of the parts arranged on it. The retaining structure 52 is designed as an elongated rail which is securely fastened to a guide rail 34 by means of a clamping device 62. The retaining structure 52 is arranged such that it bears against a rail foot 64 of the guide rail 34, i.e., it is arranged between the guide rail 34 and a shaft wall of the elevator shaft 14 on which the guide rail 34 is securely fastened. A fastening device 66, shown enlarged in FIG. 4, by means of which the measuring tape 36 can be fastened to the retaining structure 52, is arranged on an end of the retaining structure 52 opposite the guide rail 34. The fastening device 66 consists of an intermediate plate 68 securely fastened to the retaining structure 52 by means of two screw-nut connections 70 and a clamping plate 74 securely fastened to the retaining structure 52 by means of four further screw-nut connections 72. The measuring tape 36 runs between the intermediate plate 68 and the clamping plate 74 and is thus clamped between the clamping plate 74 and the intermediate plate 68. Since the intermediate plate 68 is securely fastened to the retaining structure 52, the measuring tape 36 is thus at least indirectly clamped between the clamping plate 74 and the retaining structure 52. On its upper and lower edge, the clamping plate 74 has a fold 76 facing away from the retaining structure 52. The intermediate plate 68 and the clamping plate 74 can be provided with a rubber coating at least on their side facing the measuring tape 36.

A receiving device 78 for receiving a measuring tape supply 80 symbolically depicted as a circle is also arranged on the retaining structure 52. The measuring tape supply 80 comprises a measuring tape piece 82 which is arranged along the extension portion 58 when the travel path 16 is extended. The receiving device 78 is designed as one piece. It has a horizontally running support surface 84 which is arranged below the retaining structure 52. The measuring tape supply 80 can thus be supported downwards on the support surface 84 and horizontally in the direction of the guide rail 34 on the retaining structure 52.

The receiving device 78 also has an end surface 86 which runs at a right angle to the support surface 84 and is arranged mainly parallel and at a specific distance from the retaining structure 52. It protrudes upwards beyond the retaining structure 52. A maximum extension of the end surface 86 along the retaining structure 52 in the region of the support surface 84 is in this case less than a maximum extension of the end surface 86 above the retaining structure 52. The measuring tape supply 80 supported on the support surface 84 is thus partially arranged between the retaining structure 52 and the end surface 86.

The receiving device 78 is laterally closed by two opposing side cheeks 88 connected to the end surface 86 and running at right angles thereto, which delimit a horizontal movement of the measuring tape supply 80 along the retaining structure 52. In addition, the two side cheeks 88 each have a support surface 90 opposite the end surface 86, which also results in a right angle between the support surface 90 and the side cheek 88. Furthermore, the two side cheeks 88 each have a lug 94 via which the side cheeks 88 and thus the receiving device 78 are screwed and thus securely fastened to the retaining structure 52. For this purpose, the lugs 94 each have a through hole (not depicted) through which a screw can be inserted for screwing to the retaining structure 52.

The support surface 84, the end surface 86, and the side cheeks 88 having the support surfaces 90 are arranged such that a container, in particular a cardboard box 92, accommodating the measuring tape supply 80 can be accommodated with an exact fit.

The measuring tape 36, the retaining structure 52, the fastening device 66, and the receiving device 78 together form a measuring tape arrangement 96. The measuring tape arrangement 96, the read-out device 38, and the evaluation device 48 together form a positioning system 98 (see FIG. 1).

Finally, it must be noted that terms such as "having," "comprising," etc. do not preclude other elements or steps and terms such as "a" or "an" do not preclude a plurality. It must further be noted that features or steps that have been described with reference to one of the above embodiments can also be used in combination with other features or steps of other embodiments described above.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A measuring tape arrangement for use in an elevator system to determine a position of an elevator car along a travel path, the measuring tape arrangement comprising:

a one-piece measuring tape adapted to be arranged along the travel path of the elevator car, wherein location information is stored along the measuring tape for determining a current position on the travel path relative to the measuring tape;

a retaining structure adapted to be arranged at one end of the travel path, the measuring tape being fastened to the retaining structure by a fastening device at a fixed position relative to the travel path when the retaining structure is arranged at the one end of the travel path; and a receiving device receiving a measuring tape supply, the receiving device being arranged on the retaining structure, wherein a measuring tape piece of the measuring tape supply is adapted to be arranged along an extension portion of the travel path when the travel path is extended upwards by the extension portion.

2. The measuring tape arrangement according to claim 1 wherein the one end of the travel path is an upper end of the travel path and the retaining structure is adapted to be arranged at the upper end of the travel path.

3. The measuring tape arrangement according to claim 1 wherein the receiving device has a support surface arranged such that the measuring tape supply is supported downwards on the support surface and horizontally on the retaining structure, and has an end surface arranged such that the measuring tape supply when supported on the support surface is at least partially arranged between the retaining structure and the end surface.

4. The measuring tape arrangement according to claim 3 wherein the receiving device has two opposite side cheeks arranged such that a horizontal movement of the measuring tape supply along the retaining structure is delimited.

5. The measuring tape arrangement according to claim 4 wherein at least one of the side cheeks has a support surface opposite the end surface of the receiving device.

6. The measuring tape arrangement according to claim 4 wherein at least one of the side cheeks has a lug by which the receiving device is securely fastened to the retaining structure.

7. The measuring tape arrangement according to claim 1 wherein the receiving device is formed as one piece.

8. The measuring tape arrangement according to claim 1 wherein the fastening device is adapt to clamp and hold the measuring tape.

9. The measuring tape arrangement according to claim 8 wherein the fastening device has a clamping plate securely fastened to the retaining structure such that the measuring tape is clamped between the clamping plate and the retaining structure.

10. The measuring tape arrangement according to claim 9 wherein the clamping plate has on at least one of an upper edge and a lower edge a fold facing away from the retaining structure.

11. The measuring tape arrangement according to claim 1 wherein the retaining structure is adapted to be securely fastened to a guide rail of the elevator system.

12. A positioning system for use in an elevator system for determining a position of an elevator car along a travel path, the positioning system comprising: the measuring tape arrangement according to claim 1; a read-out device for reading the location information stored on the measuring tape; and an evaluation device receiving the location information read out by the read-out device for at least one of evaluation and preprocessing the received location information.

13. An elevator system comprising:

an elevator car vertically movable along a travel path;

a drive machine driving a belt arrangement to move the elevator car along the travel path;

a controller controlling the drive machine; and a positioning system according to claim 12 determining a position of the elevator car along the travel path and providing the determiner position to the controller.

14. A method for installing and operating an elevator system in an elevator shaft of a building during a construction phase of the building, the method comprising the steps of:

introducing the measuring tape arrangement according to claim 1 into the elevator shaft, wherein the retaining structure of the measuring tape arrangement is fastened to an upper end of a lower travel path portion of the travel path, the measuring tape of the measuring tape arrangement being fastened to the retaining structure by the fastening device, and the measuring tape supply being arranged in the receiving device;

extending the travel path upwards by an extension portion, wherein the measuring tape is detached from the retaining structure, the measuring tape piece of the measuring tape supply is arranged along the extension portion, the retaining structure is arranged at an upper end of the extension portion, and the measuring tape is fastened to the retaining structure by the fastening device; and moving the elevator car along the lower travel path portion and the extension portion and determining a position of the elevator car by the measuring tape arrangement.

* * * * *